United States Patent [19]

Nehorai et al.

[11] Patent Number: 5,315,308

[45] Date of Patent: May 24, 1994

[54] METHOD FOR ELETROMAGNETIC SOURCE LOCALIZATION

[75] Inventors: Arye Nehorai, Branford; Eytan Paldi, New Haven, both of Conn.

[73] Assignee: Yale University, New Haven, Conn.

[21] Appl. No.: 971,304

[22] Filed: Nov. 4, 1992

[51] Int. Cl.⁵ .............................................. G01S 5/04
[52] U.S. Cl. ................................................. 342/448
[58] Field of Search ........................ 342/351, 386, 448

[56] References Cited

U.S. PATENT DOCUMENTS

| | | |
|---|---|---|
| 4,054,881 | 10/1977 | Raab . |
| 4,613,866 | 9/1986 | Blood ................................. 342/448 |
| 4,737,794 | 4/1988 | Jones ................................. 342/448 |

OTHER PUBLICATIONS

An Optically Linked Electric and Magnetic Field Sensor for Poynting Vector Measurements in the Near Fields of Radiating Sources–Lanny D. Driver.
Motohisa Kanda–IEEE Transactions on Electromatgnetic Compatibility–vol. 30, No. 4, Nov., 1988, pp. 495-506.
An Electromagnetic Near-Field Sensor for Simultaneous Electric and Magnetic-Field Measurements–Motohisa Kanda, Sr. Member IEEE–IEEE Transactions on Electro–Magnetic Compatibility, vol. EMC-26, No. 3, pp. 102-110-Aug., 1984.
A Three-Loop Method for Determining the Radiation Characteristics of an Electrically Small Source–IEEE Transactions on Electromagnetic Compatibility vol. 34, No. 1, pp. 1-3, Feb., 1992.
Vector Sensor Processing for Electromagnetic Source Localization A. Nehorai & E. Paldi, Prod. 25th Asilomar Conf. on Signals, Systems & Computers Pacific Grove, Calif. Nov. 4-6, 1991.

*Primary Examiner*—Theodore M. Blum
*Attorney, Agent, or Firm*—Perman & Green

[57] ABSTRACT

A method for determining a direction of arrival of an electromagnetic wave comprises the steps of: measuring sets of electric and magnetic components of an electromagnetic wave as sensed from a lumped antenna structure; finding a cross product for each measured set of electric and magnetic components so as to derive an orthogonal vector value therefrom; deriving the Castesian components for each direction vector value so determined; averaging like component vectors for each measured electric and magnetic vector component set over a plurality of measurements; and deriving a direction vector from the averaged vector values.

14 Claims, 4 Drawing Sheets

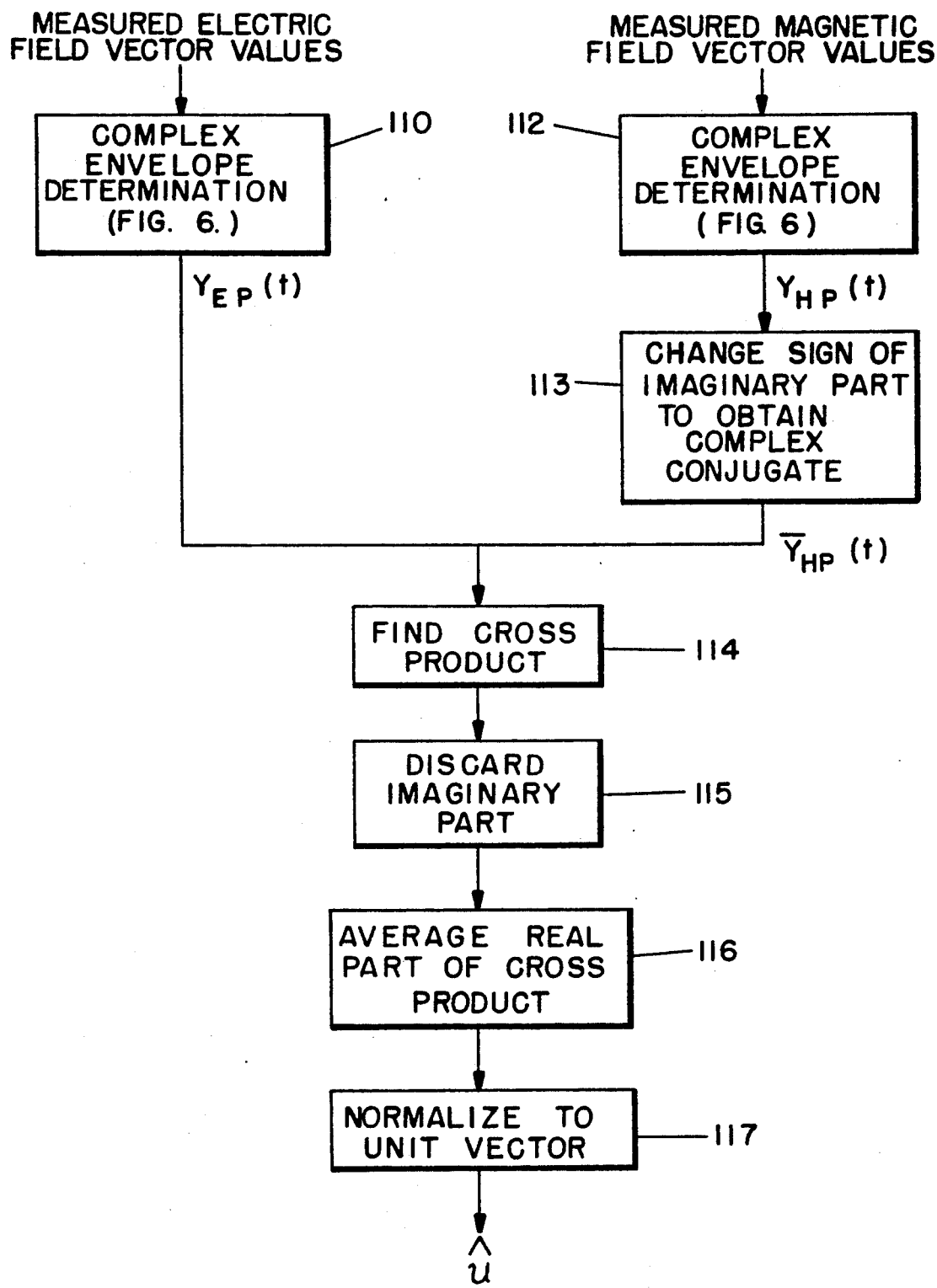

METHOD FOR ELETROMAGNETIC SOURCE LOCALIZATION

This invention was made with government support under grant numbers N00014-91-J-1298 and AFOSR-90-0164 awarded by the Office of Naval Research and the Air Force Office of Scientific Research, respectively. The government has certain rights in the invention.

FIELD OF THE INVENTION

This invention relates to methods for localizing a source of electromagnetic radiation and, more particularly, to performing such method with a lumped vector sensor.

BACKGROUND OF THE INVENTION

Most existing methods for localizing a source of electromagnetic signals employ a multi-sensor, dispersed array. Output data from each sensor is a scalar value that corresponds, for example, to the magnitude of the electric field at the sensor. Using such magnitude values, a direction vector can be derived from the array to the source of electromagnetic energy based upon time difference of arrivals. Directionally adjustable single sensors (e.g. rotatable loops) have also been used to derive a vector direction to an electromagnetic source, based upon an orientation of the sensor wherein a maximum signal output is seen. Multi-sensor arrays, because they occupy considerable space, are not well suited to airborne applications or to mobile systems which require limited size antenna sensors. Single sensor systems that rely upon scalar electric field values are slow in response. In the prior art, investigators have designed electromagnetic sensors that detect not only an electromagnetic wave's electric field but also its magnetic field. Kanda et al., in studying the biological effects of electromagnetic radiation, designed loop antenna type sensors to provide simultaneous voltage outputs that gave both electric and magnetic field component values for an incident electromagnetic wave. The resultant field measurements were employed to derive the magnitude of a Poynting vector (a vector that is the power flux density of the field). Kanda et al. used the calculated Poynting vector values to describe an electromagnetic field's energy flow and thus its potential effect on biologic materials. The Kanda et al. work is described in: "An Electromagnetic Near/Field Sensor For Simultaneous Electric and Magnetic/Field Measurements", IEEE Transactions on Electromagnetic Compatibility, Vol. EMC-26, No. 3, 1984, pages 102–110; "An Optically Linked Electric and Magnetic Field Sensor For Poynting Vector Measurements In The Near Fields of Radiating Sources", IEEE Transactions on Electromagnetic Compatibility, Vol. 30, No. 4, November 1988, pages 495–503; and "A Three-Loop Method For Determining the Radiation Characteristics of an Electrically Small Source", IEEE Transactions on Electromagnetic Compatibility, Vol. 34, No. 1, February 1992, pages 1–3.

It is an object of this invention to provide a method for determining a direction to a source of electromagnetic radiation in a noisy environment, such method employing a lumped vector sensor.

It is another object of this invention to provide an improved method for determining a direction of arrival (DOA) of an electromagnetic wave in a noisy environment, the method employing both electric and magnetic field measurements.

It is yet another object of this invention to provide a improved method for determining the DOA of an electromagnetic wave that is suited to airborne and mobile applications.

SUMMARY OF THE INVENTION

A method for determining a direction of arrival of an electromagnetic wave from noisy data comprises the steps of: measuring sets of electric and magnetic components of an electromagnetic wave as sensed from an antenna structure; finding a cross product for each measured set of electric and magnetic components; deriving the orthogonal Cartesian components for each vector value so determined; averaging like component vectors over a plurality of measurements; and deriving a (unit length) direction vector from the averaged vector values. A further embodiment employs a modulating signal, instead of a carrier, from which to derive direction vectors. Weighting of cross product vector values is also employed to enable the most accurate cross product values to have a greater influence on the determination of a unit length direction vector.

DESCRIPTION OF THE DRAWINGS

FIG. 7 illustrates a flow diagram for a frequency domain procedure for determining source direction.

DETAILED DESCRIPTION OF THE INVENTION

(1) General Description

Figures 1, 1A:
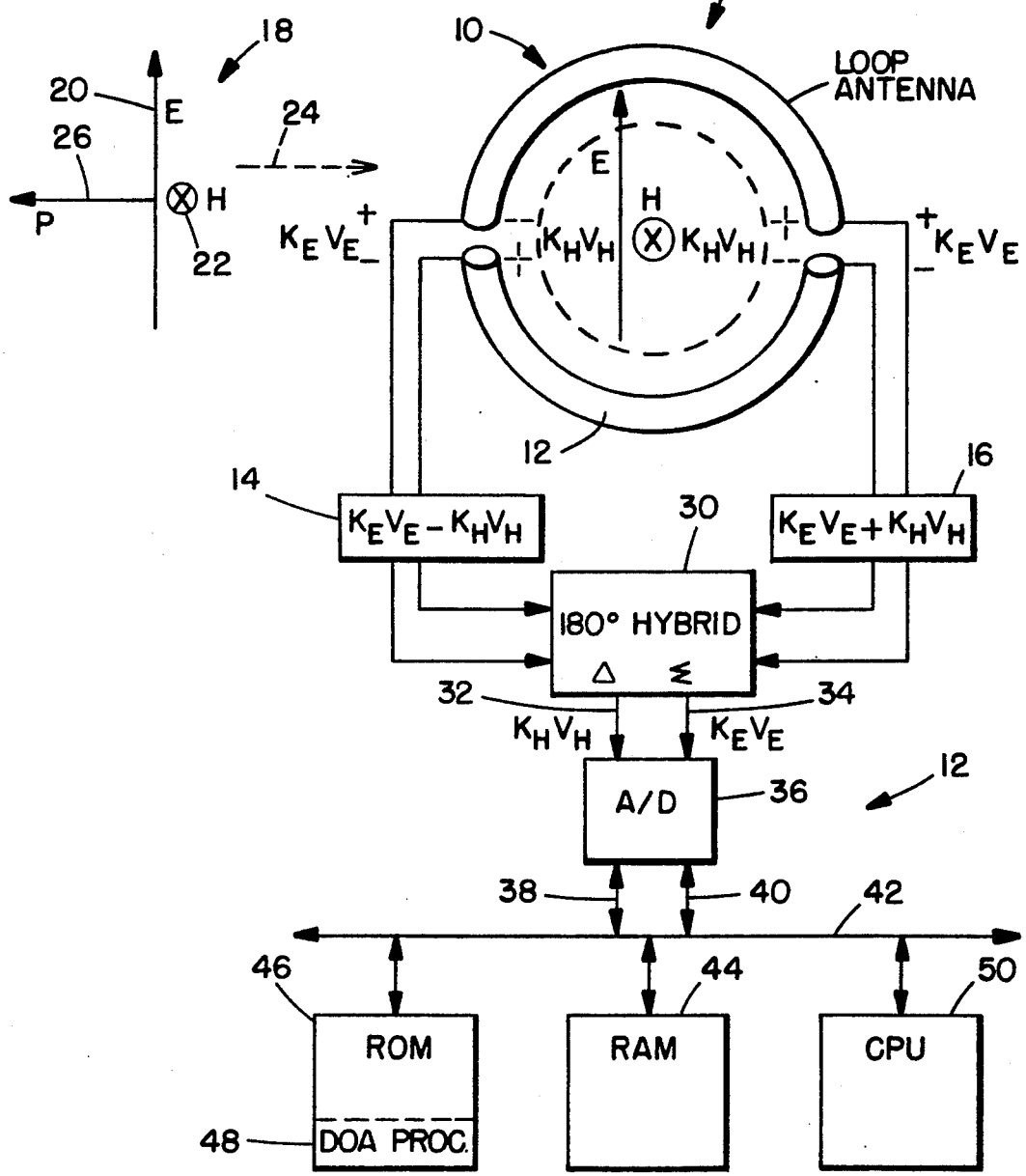
FIG. 1 illustrates a block diagram of an electromagnetic sensor and allied processing components for performing the method of the invention.
FIG. 1A schematically shows three orthogonally oriented loop antennas.

As will be understood, the method hereof is dependent upon the sensing of orthogonal components of electric and magnetic components of an incident electromagnetic wavefront. Such components may be determined, for example as shown in FIG. 1A, by using three antenna dipoles to sense the electric field's x, y and z components and three orthogonally oriented loops to sense the magnetic field's x, y and z components. Another exemplary and more compact antenna (sensor) structure for sensing the aforesaid components is shown in FIG. 1 and includes three orthogonally oriented loop antennas 6, 8 and 10 that are shown schematically at the upper right. Loop antennas 6, 8 and 10 are oriented in the y/z, x/y and x/z planes, respectively.

A more detailed view of loop antenna 10 is shown in combination with an attached processor 12. The connections between processor 12 and loop antennas 6 and 8 are not shown to avoid complication of the view.

An incident wave 18, whose direction of arrival (DOA) is to be measured, includes an electric field vector 20 and a magnetic field vector 22. The direction of propagation of wave 18 is shown by dotted arrow 24 and the direction vector for electric and magnetic field vectors 20 and 22 is as shown by arrow 26.

Outputs from loads 14 and 16 are fed, respectively, to a 0°/180° hybrid junction 30 that provides both difference ($\Delta$) and summation ($\Sigma$) outputs on lines 32 and 34. The output on line 34 is a voltage that is proportional to the electric field ($K_E V_E$) and the output on line 32 is proportional to the magnetic field ($K_H V_H$). Those potentials are periodically sampled in analog to digital converter 36 and the sampled values are provided as outputs on lines 38 and 40 to bus 42. The sampled values are then stored in RAM 44 until they can be processed to determine the DOA of wavefront 18. A read only memory (ROM) 46 contains a subroutine 48 for determining the DOA of wavefront 18. To perform the procedure, DOA procedure 48 is selectively called by central processing unit 50 and provides either time domain or frequency domain routines to enable a wavefront's DOA to be determined.

Recall that loop antenna 10 provides electric and magnetic field outputs proportional to the orthogonal field components in the x, z plane. While not shown, loop antennas 6 and 8 would likewise provide electric and magnetic field components that are sensed in the y, z and x, y planes to A/D converter 36 and RAM 44.

Figure 2:
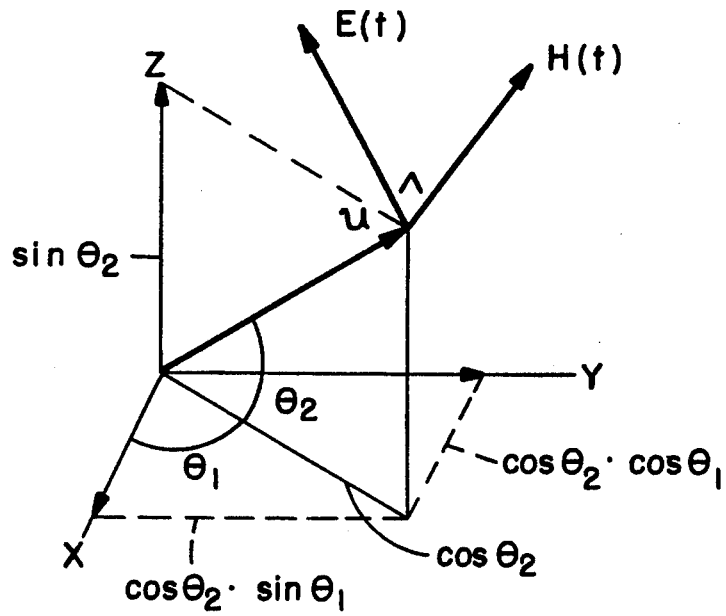
FIG. 2 is a vector illustration in x, y, z, space illustrating a plane defined by a pair of electric and magnetic field vectors and a "direction of arrival" (unit length) vector u that is normal to the plane.

Turning now to FIG. 2, a vector diagram illustrates a pair of orthogonal (noise free) vectors E(t) and H(t) which represent time varying electric and magnetic field vectors and define a plane in space. Determination of a cross product between the (noise free) vectors E(t) and H(t) and normalization results in the derivation of a DOA vector u. The DOA vector u is resolvable into its x, y and z components and may, in turn, be expressed in terms of direction cosines based upon azimuth angle $\theta_1$ and elevation angle $\theta_2$. Those direction cosines are illustrated in FIG. 2.

While the system of FIG. 1 may determine a DOA vector u from a single snapshot of voltages $V_E$ and $V_H$, noise inherently present in the system will cause variations in the direction cosines of DOA vector u. As will be understood, the system of FIG. 1 compensates for this variation by averaging the x,y and z direction cosines over a plurality of time-sampled field measurement so as to achieve an averaged DOA vector u that provides an accurate DOA value.

Figure 3:
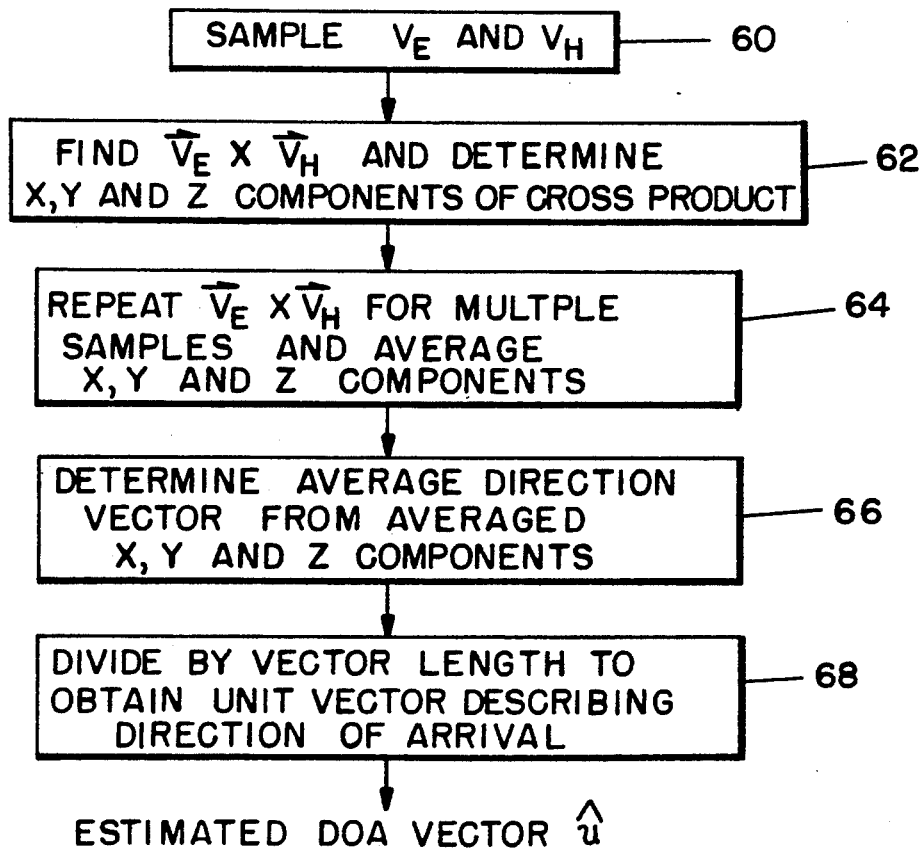
FIG. 3 is a flow diagram illustrating a time domain procedure for determining source direction.

Turning now to FIG. 3, a preferred DOA localization method will be described in conjunction with FIGS. 1 and 2. The procedure commences with the provision of timed samples of $V_E$ and $V_H$ from antennas 6, 8 and 10 (box 60). The sampled values are converted to digital values and stored. The stored values are converted to vector quantities for the electric and magnetic field values. A cross product (box 62) between the electric and magnetic vector measurements is then derived. The x, y and z components of the cross product vectors are determined and such values are stored.

The procedure is repeated (box 64) for multiple $V_E$ and $V_H$ samples. An averaged cross product vector is then determined from the averaged x, y and z components (box 66). Since however, it is only the direction cosines of DOA vector u that are of interest, the averaged cross product vector is divided by its absolute value so as to convert it to a unit vector with its associated direction cosines (box 68).

Figure 4:
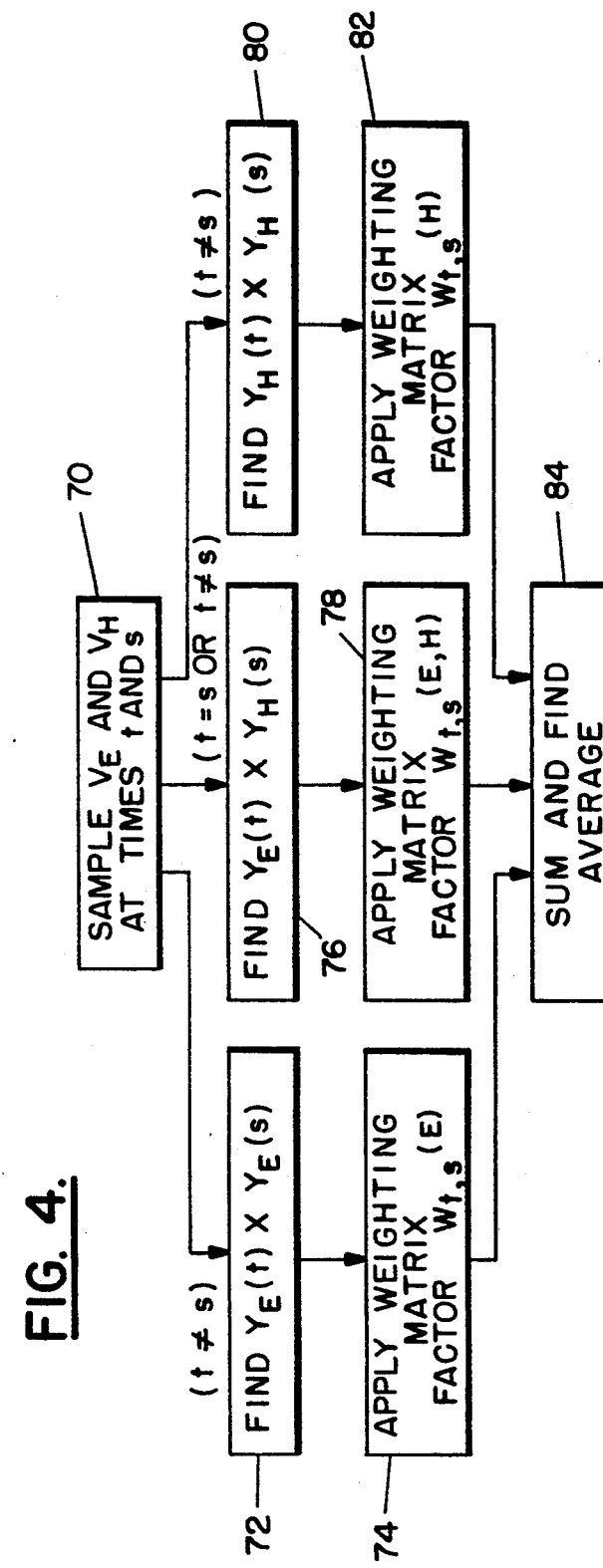
FIG. 4 is a time domain procedure for determining source direction employing both electric and magnetic fields sensed at various times, with weighting values applied to respective cross products.

Turning to FIG. 4, an extension to the embodiment shown in FIG. 3 is illustrated. In this case, cross products are derived for (1) sensed electric field vector values taken at different times; (2) sensed magnetic field vector values taken at different times, and (3) sensed electric and magnetic field vector values taken at various times. As is known, both electric and magnetic field vectors precess (i.e., "rotate") as they propagate through space. Thus, by sensing the field vectors at different times, the rotated vectors define a plane. If, a cross product is derived for the succeeding vector values that define the plane, its direction is perpendicular to the plane.

Depending upon transmission conditions, distortions that occur in the sensing antenna and other processing inaccuracies, the cross product values can be weighted so as to either increase or decrease the importance of any one or more of the thus derived values. Then, when all of the values are summed and averaged, a more accurate DOA vector u is determined. A mathematical description of the aforementioned procedure is as follows:

$$\frac{1}{N^2} \sum_{t,s=1}^{N} [W_{t,s}^{(E)} y_E(t) x y_E(s) + \qquad (A)$$

$$W_{t,s}^{(E,H)} y_E(t) x y_H(s) + W_{t,s}^{(H)} y_H(t) x y_H(s)]$$

where:
x is the cross product operator
$Y_E(t)$ and $Y_H(s)$ are electric vector field values sensed at times t and s respectively.
$Y_H(t)$ and $Y_H(s)$ are magnetic vector field values sensed at times t and s respectively; and
W is a weighting matrix that may vary in value in time and when applied to the electric, magnetic or combined electric and magnetic field computations.

As shown in FIG. 4, the values $V_E$ and $V_H$ are sampled at times t and s (box 70). As a result, electric field vector values $Y_E$ are determined for times t and s, (as are magnetic field vector values $Y_H$). The cross product is then found between the subsequent electric field vector values (box 72), and the subsequent magnetic field vector values (box 80) respectively sensed at times t and s, where t is not equal to s. A further cross product is determined for electric and magnetic field vector values where times t and s may be either the same or different (box 76). The resultant cross product values are then weighted (boxes 74, 78 and 82); the resultants are summed; and the average thereof is found (box 84) and converted to a unit norm (box 85) to arrive at an estimate DOA vector û. The weighting factors W (each 3×3 matrix) can be altered so as to assure that the most accurate cross product value has the greater influence in determining the resulting DOA vector û.

Figure 5:
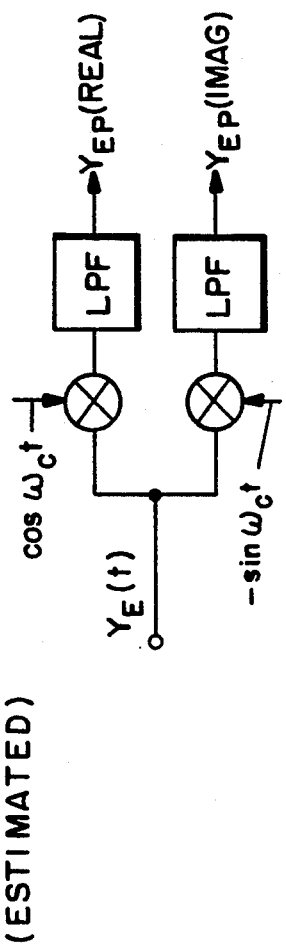
FIG. 5 illustrates a plot of amplitude versus frequency for a received signal having a center frequency $\omega_c$.

Turning to FIG. 5, a plot of voltage versus frequency indicates a spectrum 100 of a received electromagnetic signal. Spectrum 100 has a center frequency $\omega_c$ and is generally modulated by a much lower frequency signal that may be either single frequency or multi frequency.

If the incoming signal is "mixed" down to either a baseband frequency ($\omega_0$) or to a frequency substantially lower than $\omega_c$, the required processing to find a DOA vector u can be more easily accomplished.

Figure 6:
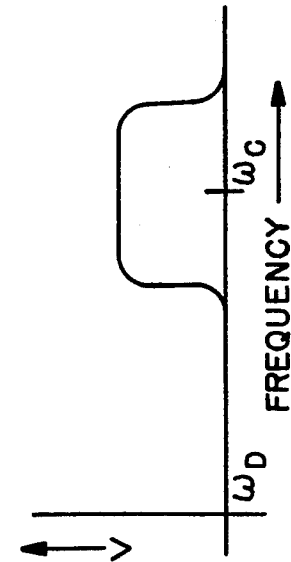
FIG. 6 illustrates a modulation procedure for reducing the center frequency $\omega_c$ to a baseband so as to enable a DOA vector to be determined from a lower frequency modulating (phasor) signal rather than a carrier frequency of center frequency $\omega_c$.

Accordingly, within processor 12 (FIG. 1), electric and magnetic field vector values $Y_E(t)$ and $Y_H(t)$ are derived from the sampled measurements of $V_H$ and $V_E$ from antennas 6, 8 and 10. To convert each vector value to its baseband value (see FIG. 6 for $Y_E(t)$ conversion), it is multiplied (i.e. mixed) with both $\cos\omega_c t$ and $-\sin\omega_c t$. The multiplication procedure provides both sum and difference frequencies, and the results are low pass filtered to eliminate the sum frequency products and reduce noise. As a result, the output is representative of the real and imaginary values of the electric and magnetic phasors of the modulating envelope ($Y_{EP}$ and $Y_{HP}$) In FIG. 6, the functions described are schematically illustrated for $Y_{EP}$. An identical system derives $Y_{HP}$.

The complex envelope calculations are illustrated in boxes 110 and 112 in FIG. 7. The measured magnetic field value has the sign of its imaginary part changed so as to derive its complex conjugate (box 113). A succeeding cross product calculation is performed (box 114) and only the real components of the resulting cross product (box 115) is considered (as derived from the electric and magnetic field vectors that make up the modulating envelope). Those real values are then averaged over a plurality of sample times (box 116) and normalized (box 117) to arrive at an estimated DOA vector $\hat{u}$.

The following Sections 2 and 3 illustrate the procedures for a single source/single vector sensor model and a cross product based DOA estimator.

(2) Single-Source Single-Vector Sensor Model

Basic Assumption

It is assumed that the wave is traveling in a nonconductive, homogeneous and isotropic medium.

Additionally, the following are also assumed:

A1: Plane wave at the sensor: This is equivalent to a far-field assumption (or maximum wavelength much smaller than the source to sensor distance), a point-like source assumption (i.e. the source size is much smaller than the source to sensor distance) and a point-like sensor (i.e. the sensor's dimensions are small compared to the minimum wavelength).

A2: Band-limited spectrum assumption: The signal has a spectrum including only frequencies $\omega_{min} \leq |\omega| \leq \omega_{max}$, where $0 < \omega_{min} < \omega_{max} < \infty$. This assumption is satisfied in practice. The lower limit on $\omega$ is also necessary for the far-field assumption.

Let $\epsilon(t)$ and $\mathcal{H}(t)$ be the noise free vector phasor representations (or complex envelopes) of the electric and magnetic fields at the sensor. Also let u be the unit vector at the sensor pointing towards the source, i.e.

$$u = \begin{bmatrix} \cos\theta_1 \cos\theta_2 \\ \sin\theta_1 \cos\theta_2 \\ \sin\theta_2 \end{bmatrix} \quad (2.1)$$

where $\theta_1$ and $\theta_2$ denote, respectively, the azimuth and elevation angles of u, (see FIG. 2).

For plane waves, the Maxwell equations can be reduced to an equivalent set of two equations without any loss of information. Under the additional assumption of a band-limited signal, the two equations can be written in terms of phasors. The results are summarized in the following theorem.

Theorem 2.1: Under assumption A1, the Maxwell equations can be reduced to an equivalent set of two equations. With the additional band-limited spectrum assumption A2 they can be written as:

$$u \times \epsilon(t) = -\eta \mathcal{H}(t) \quad (2.2a)$$

$$u \cdot \epsilon(t) = 0 \quad (2.2b)$$

where $\eta$ is the intrinsic impedance of the medium and "×" and "·" are the cross and inner products of $R^3$ applied to vectors in $C^3$. (That is, if v, w $\in C^3$ then $v \cdot w = \Sigma v_i w_i$. This is different than the usual inner product of $C^3$).

Thus, under the plane and band-limited wave assumptions, the vector phasor equations (2.2) provide all the information contained in the original Maxwell equations. This result will be used in the following to construct measurement models in which the Maxwell equations are incorporated entirely.

The Measurement Model

Suppose that a vector sensor measures all six components of the electric and magnetic fields. (It is assumed that the sensor does not influence the electric and magnetic fields). The measurement model is based on the phasor representation of the measured electromagnetic data (with respect to a reference frame) at the sensor. Let $Y_E(t)$ be the measured electric phasor field vector at the sensor at time t and $e_E(t)$ its noise component. Then the electric part of the measurement will be $$Y_E(t) = \epsilon(t) + e_E(t) \quad (2.3)$$

Similarly, from (2.2a), after appropriate scaling, the magnetic part of the measurement will be taken as $$Y_H(t) = u \times \epsilon(t) + e_H(t) \quad (2.4)$$

In addition to (2.3), (2.4), the constraint of (2.2b) is also present.

Define the matrix cross product operator that maps a vector $v \in R^{3 \times 1}$ to $u \times v \in R^{3 \times 1}$ by $$(u \times) \triangleq \begin{bmatrix} 0 & -u_z & u_y \\ u_z & 0 & -u_x \\ -u_y & u_x & 0 \end{bmatrix} \quad (2.5)$$

where $u_x$, $u_y$, $u_z$, are the x, y, z components of the vector u. With this definition, equations (2.3) and (2.4) can be combined to $$\begin{bmatrix} y_E(t) \\ y_H(t) \end{bmatrix} = \begin{bmatrix} I_3 \\ (u \times) \end{bmatrix} \epsilon(t) + \begin{bmatrix} e_E(t) \\ e_H(t) \end{bmatrix} \quad (2.6)$$

where $I_3$ denotes the 3×3 identity matrix. From the constraint (2.2b), the electric phasor $\epsilon(t)$ can be written $$\epsilon(t) = V\xi(t) \quad (2.7)$$

where V is a 3×2 matrix whose columns span the orthogonal complement of u and $\xi(t) \in C^{2 \times 1}$. The matrix $$V = \begin{bmatrix} -\sin\theta_1 & -\cos\theta_1\sin\theta_2 \\ \cos\theta_1 & -\sin\theta_1\sin\theta_2 \\ 0 & \cos\theta_2 \end{bmatrix} \quad v_1 \quad v_2 \tag{2.8}$$

whose columns are orthonormal may be checked to assure that it satisfies this requirement. For future reference, since $||u||^2=1$, the columns of V, denoted as $v_1$ and $v_2$, can be constructed, for example, from the partial derivatives of u with respect to $\theta_1$ and $\theta_2$ and post normalization when needed. Thus $$v_1 = \frac{1}{\cos\theta_2} \frac{\partial u}{\partial \theta_1} \tag{2.9a}$$

$$v_2 = u \times v_1 = \frac{\partial u}{\partial \theta_2} \tag{2.9b}$$

and (u, $v_1$, $v_2$) is a right orthonormal triad. The signal $\xi(t)$ fully determines the components of $\epsilon(t)$ in the plane where it lies, namely the plane orthogonal to u spanned by $v_1$, $v_2$. This implies that there are two degrees of freedom present in the spatial domain (or the wave's plane), or that two independent signals can be transmitted simultaneously.

Combining (2.6) and (2.7) produces $$\begin{bmatrix} y_E(t) \\ y_H(t) \end{bmatrix} = \begin{bmatrix} I \\ (u \times) \end{bmatrix} V\xi(t) + \begin{bmatrix} e_E(t) \\ e_H(t) \end{bmatrix} \tag{2.10}$$

This system is equivalent to (2.6).

(3) Cross Product Based DOA Estimator

The algorithm for estimating the DOA of a single electromagnetic source using the measurements of a single vector sensor is described below. Observe that $-u$ is the unit vector in the direction of the Poynting vector $$S(t) = E(t) \times H(t) = Re\{e^{i\omega_c t} \cdot \epsilon(t)\} \times Re\{e^{i\omega_c t}\mathcal{H}(t)\} \tag{3.1}$$
$$= 1/2 Re\{\epsilon(t) \times \overline{\mathcal{H}}(t)\} + 1/2 Re\{e^{i2\omega_c t}\epsilon(t) \times \mathcal{H}(t)\}$$

where $\overline{\mathcal{H}}$ denotes the complex conjugate of $\mathcal{H}$. The carrier time average of the Poynting vector is defined as $\langle S \rangle_t \triangleq \frac{1}{2}RE\{\epsilon(t) \times \overline{\mathcal{H}}(t)\}$. Note that unlike $\epsilon(t)$ and $\mathcal{H}(t)$, this average is not a function of $\omega_c$, thus it has an intrinsic physical meaning.

At this point, there are two possible ways for estimating u:

1. Phasor time averaging of $\langle S \rangle_t$ yielding a vector denoted by $\langle S \rangle$, with the estimated u taken as the unit vector in the direction of $-\langle S \rangle$.
2. Estimation of u by phasor time averaging of the unit vectors in the direction of $Re\{\epsilon(t) \times \overline{\mathcal{H}}(t)\}$.

Clearly, the first way is preferable, since then u is estimated after the measurement noise is reduced by the averaging process, while the estimated u in the second manner is more sensitive to the measurement noises which may be magnified considerably.

Thus, the algorithm computes $$\hat{s} = \frac{1}{N} \sum_{t=1}^{N} Re\{y_E(t) \times y_H(t)\} \tag{3.1a}$$

$$\hat{u} = \hat{s}/||\hat{s}|| \tag{3.1b}$$

The statistical performance of this estimator $\hat{u}$ is summarized by the following theorem.

Theorem 3.1: The estimator $\hat{u}$ has the following properties:

a) If $||\xi(t)||^2, ||e_E(t)||, ||e_H(t)||$ have finite first order moments, then $\hat{u} \to u$ almost surely.

b) If $||\xi(t)||^2, ||e_E(t)||, ||e_H(t)||$ have finite second order moments, then $\sqrt{N}(\hat{u}-u)$ is asymptotically normal.

c) If $||\xi(t)||^2, ||e_E(t)||, ||e_H(t)||$ have finite fourth order moments, then the MSAE of $\hat{u}$ is $$MSAE = \tfrac{1}{4} \rho^{-1} (1 + 4\rho^{-1})(r + r^{-1})^2 \tag{3.2}$$

where:
- $\rho$=signal to noise ratio
- $r$=ratio of magnetic and electric standard noise deviations
- MSAE=the normalized asymptotic mean-square angular error of a direction estimator.

$$MSAE \triangleq \lim_{N \to \infty} \{NE(\delta^2)\},$$

where $\delta$=angle between u and $\hat{u}$ d) Under the conditions of c), $N\delta^2$ is asymptotically $\chi^2$ distributed with two degree of freedom.

The estimator (3.1a, b) can be improved by using a weighted average of cross products between all possible pairs of real and imaginary parts of $Y_E(t)$ and $Y_H(s)$ taken at arbitrary times t and s. (Note that these cross products have directions nearly parallel to the basic estimator $\hat{u}$ in (3.1), however, before averaging, these cross products should be premultiplied by $+1$ or $-1$ in accordance with the direction of the basic estimator $\hat{u}$). A similar algorithm suitable for real time applications can also be developed in the time domain without preprocessing needed for phasor representation. It can be extended to nonstationary inputs by using a moving average window on the data.

The advantages of the proposed cross product based algorithm and its variants above are:

It can give a direction estimate instantly, i.e. with one time sample.

It is simple to implement (does not require minimization of a cost function) and can be applied in real time.

It is equally applicable to sources of various types (e.g. wide-band spectrum and non-Gaussian).

Its MSAE is near optimal in the Gaussian case.

It does not depend on time delays and therefore does not require data synchronization among different sensor components.

It should be understood that the foregoing description is only illustrative of the invention. Various alternatives and modifications can be devised by those skilled in the art without departing from the invention. For instance, certain matrix weighting values in equation A (page 9) may be set equal to zero so that the DOA vector u is estimated solely from either electric field measurements or magnetic field measurements, but not both. Accordingly, the present invention is intended to embrace all such alternatives, modifications and variances which fall within the scope of the appended claims.

We claim:

1. In a system including an antenna structure and a data processing system, a method for determining a direction of arrival (DOA) of an electromagnetic plane wave from a radiating source, said electromagnetic wave exhibiting a maximum wavelength much smaller than radiating source to antenna structure distance said method comprising the steps of:
   (a) measuring and storing sets of electric and magnetic vector components from a received electromagnetic plane wave as sensed by said antenna structure, each set defining a plane in space;
   (b) deriving direction vectors orthogonal to planes defined by said measured sets of electric and magnetic vector components;
   (c) finding three dimensional components of each said direction vector;
   (d) averaging like dimension components for a plurality of direction vectors; and
   (e) determining said DOA by vectorially combining said averaged components.

2. The method as recited in claim 1 wherein vector components that comprise a set are each measured at the same time.

3. The method as recited in claim 1 wherein a set comprises at least a pair of electric vector components measured at succeeding times.

4. The method as recited in claim 1 wherein a set comprises at least a pair of magnetic vector components measured at succeeding times.

5. The method as recited in claim 4 wherein a set further comprises a pair of electric vectors measured at succeeding times, said direction vectors derived for at least said succeeding pairs of electric vectors and said succeeding pairs of magnetic vectors, and said DOA determined from components of all said vectors.

6. The method as recited in claim 5 further comprising the step of applying weighting values to said direction vectors to alter the contribution of said weighted direction vectors to said DOA.

7. The method as recited in claim 1 wherein said electromagnetic wave has a center frequency $\omega_c$ and a modulation waveform, said method comprising the following steps intermediate steps (a) and (b) of:
   (a1) mixing said electric and magnetic vector components with a source of frequency $\omega$ so as to derive both real and imaginary vector components of said modulation waveform; and
   (a2) modifying step (b) so as to eliminate said imaginary modulation waveform components in the process of deriving said direction vector.

8. A system for determining a direction of arrival (DOA) at a sensor of an electromagnetic plane wave from a radiating source in a noisy environment, said electromagnetic wave exhibiting a maximum wavelength much smaller than radiating source to sensor distance, said sensor comprising:
   lumped antenna means for sensing both electric and magnetic analogue field values from a received electromagnetic plane wave in at least three orthogonal spatial dimensions;
   analogue to digital (A/D) conversion means for periodically sampling said sensed electric and magnetic analogue field values and converting said sensed analogue field values to digital values, magnetic and electric field values sampled at approximately the same time termed a set; and
   processor means for deriving from each set, a direction vector orthogonal to a plane defined by said set, said processor further resolving each said derived direction vector into cartesian coordinate component values, averaging a plurality of each of said cartesian coordinate component values, and recombining said averaged cartesian coordinate component values to find a DOA vector.

9. The system as recited in claim 8 wherein said precursor means converts said DOA vector into a unit norm vector indicative of said DOA.

10. The system as recited in claim 9 wherein a set comprises electric field values sampled at succeeding times, instead of magnetic and electric field values sampled at approximately the same time.

11. The system as recited in claim 9 wherein a set comprises magnetic field values sampled at succeeding times, instead of magnetic and electric field values sampled at approximately the same time.

12. The system as recited in claim 9 wherein a set further comprises electric field values sampled at succeeding times and magnetic field values sampled at succeeding times.

13. The system as recited in claim 12 wherein said processor means applies weighting values to said direction vectors to alter contributions of said direction vectors in accordance with said weighting values.

14. The system as recited in claim 8 wherein said electromagnetic wave comprises a carrier and a modulation, said processor means deriving said direction vectors based upon said modulation.

* * * * *